No. 882,100. PATENTED MAR. 17, 1908.
J. O. DAY.
SOLAR GERMICIDE.
APPLICATION FILED JULY 3, 1907.
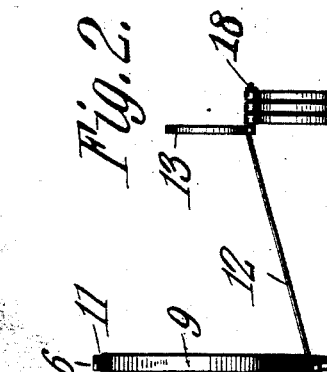
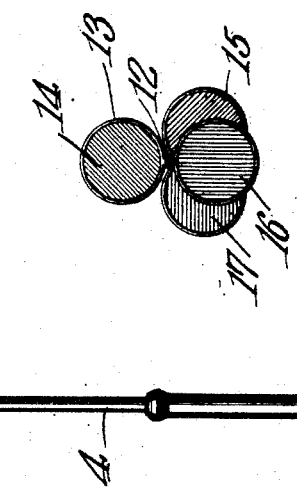
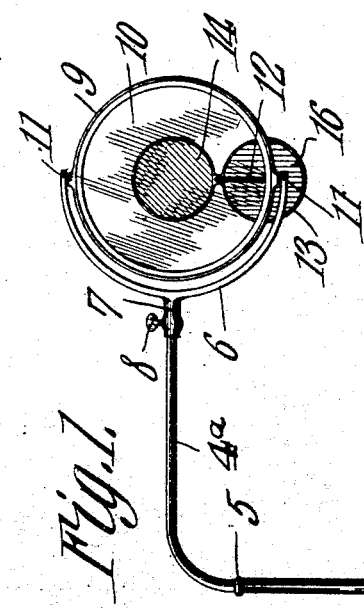
WITNESSES:
Joseph O. Day, INVENTOR.
By C. A. Snow & Co.
ATTORNEYS.

UNITED STATES PATENT OFFICE.

JOSEPH O. DAY, OF MAYFIELD, KENTUCKY.

SOLAR GERMICIDE.

No. 882,100.   Specification of Letters Patent.   Patented March 17, 1908.

Application filed July 3, 1907. Serial No. 382,047.

*To all whom it may concern:*

Be it known that I, JOSEPH O. DAY, a citizen of the United States, residing at Mayfield, in the county of Graves and State of Kentucky, have invented a new and useful Solar Germicide, of which the following is a specification.

This invention relates to solar germicides.

The object of the invention is to simplify and improve the construction of such apparatus whereby to facilitate and expedite the treatment of diseases having bacilli, bacteria or other forms of germs, or for any character of disease where solar light may be used. Furthermore, to adapt the apparatus for ready and rapid adjustments for treating the patient in any posture, either standing, sitting or reclining.

With the above and other objects in view as will appear as the nature of the invention is better understood, the same consists, generally stated, in a solar germicide embodying a standard, a collector or lens adjustably combined therewith, and a plurality of modifiers or colors supported adjacent to the lens and in such manner as to permit the ready positioning of one or more of them in focal range of the collector in order to split up and modify the sun's rays according to the requirements of the disease being treated.

The invention consists further in the novel construction and combination of parts of a solar germicide as will be hereinafter fully described and claimed.

In the accompanying drawings forming a part of this specification and in which like characters of reference indicate corresponding parts,—Figure 1 is a view in front elevation of a solar germicide constructed in accordance with the present invention. Fig. 2 is a view in side elevation thereof. Fig. 3 is a detail view, partly in section, of the modifiers. Fig. 4 is a fragmentary detail view in section, and on an enlarged scale, of a portion of one of the modifiers.

The apparatus embodies a hollow standard 1 provided at its lower end with legs or feet 2 and its upper end with a set screw 3. Engaging the standard is an approximately L-shaped bracket comprising two members 4 and 4ª, the outer or free end of which is disposed in a horizontal plane, and its intermediate portion, adjacent to its bend, being provided with an enlargement 5 constituting a stop to limit the inward movement of the bracket relatively to the standard.

Combined with the outer end of the bracket is a semicircular yoke 6 that is provided intermediate of its ends with a sleeve 7 adapted to fit upon the bracket and with a set screw 8 by which the yoke may be positively adjusted at any desired angle. The yoke supports a collector comprising a frame or rim 9 and a lens 10 of the double convex type. The frame is furnished at diametrically opposite points with pintles 11 that are designed to engage orifices provided in the yoke for the purpose, whereby the lens will be free for axial adjustments, while the collar 7 will permit the requisite angular adjustments.

Secured to the frame in any preferred manner is an upwardly-inclined arm 12, the outer end of which is disposed in a horizontal plane, and carries, in this instance, four modifiers. Each modifier comprises a frame 13 and a disk of flat appropriately-colored glass and is provided with a split collar 14 adapted frictionally to engage with the arm 12, thus to hold the modifier in operative position, as shown by one of the modifiers in Fig. 2, the upward inclination of the arm 12 causing the modifiers to occupy the proper focal position relatively to the collector, that is in planes parallel therewith. As stated, four modifier frames are herein shown and each carries a different colored glass disk, that indicated by 14 being purple, that by 15 being green, that by 16 being red and that by 17 being blue, and ordinarily these colors by combining two or more of them, will give all of the different shades desired, but as will be obvious, the number of frames 13 and colored disks may be increased if found necessary or desirable. The modifiers are held against accidental separation from the arm 12 by a nut or a sleeve 18, as clearly shown in Fig. 2.

It will be seen from the foregoing description that to adjust the collector to the proper angle to collect the sun's rays and project them through one or more of the modifiers will require but slight manipulation. If the collector be too close to the floor it will only be necessary to loosen the set screw 3 and raise the bracket to the desired height. If the sun be at such height that it will not squarely strike the collector it will only be necessary to loosen the set screw 8 and turn the frame 9 to the proper angle, while by the employment of the pintles 12 and the yoke 6 the collector may be turned axially in any direction required.

What is claimed is:—

1. A solar germicide comprising a standard, a bracket supported thereby, a yoke adjustably mounted on the bracket, a collector-carrying frame rotatably assembled with the yoke, an arm carried by the frame, and a plurality of modifier-carrying frames supported by the arm.

2. A solar germicide comprising a standard, a bracket supported thereby, a yoke adjustably mounted on the bracket, a collector-carrying frame rotatably assembled with the yoke, an arm carried by the frame, and a plurality of modifier-carrying frames, each having a split collar to engage with the arm and to be held in adjusted position by frictional contact therewith.

3. A solar germicide comprising an adjustably supported collector-carrying frame, an arm carried by the frame, and a plurality of modifier-carrying frames, each having a split collar to engage frictionally with the arm.

4. A solar germicide embodying a standard, a collector or lens adjustably combined therewith, and a plurality of modifiers of colors supported adjacent to the lens and in such manner as to permit the ready positioning of one or more of them in focal range of the collector in order to split up and modify the sun's rays according to the requirements of the disease being treated.

In testimony that I claim the foregoing as my own, I have hereto affixed my signature in the presence of two witnesses.

JOSEPH O. DAY

Witnesses:
R. W. GREENE,
S. B. COOMBS.